No. 866,986. PATENTED SEPT. 24, 1907.
J. K. TURTON.
WHEEL RIM.
APPLICATION FILED SEPT. 22, 1906.

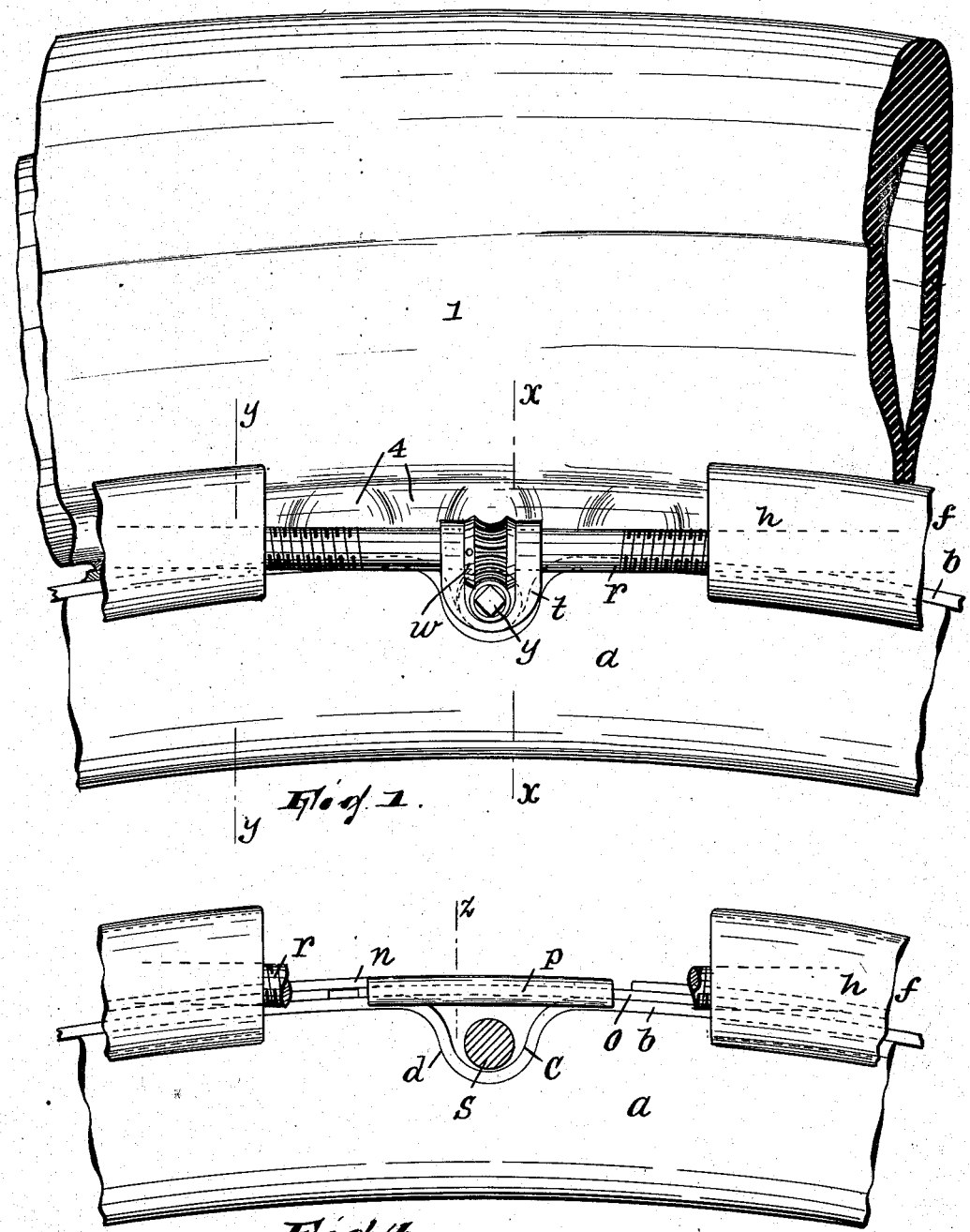

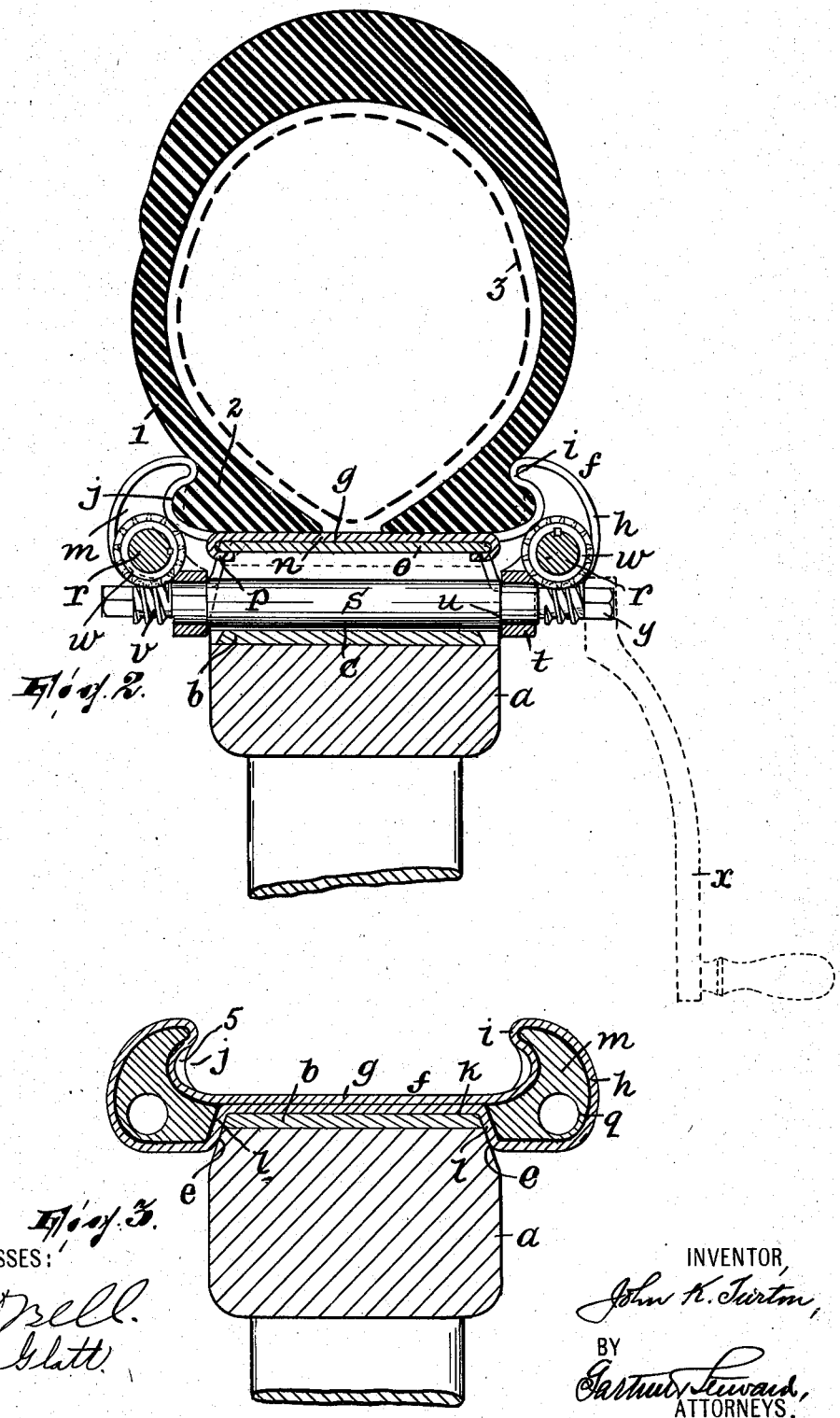

3 SHEETS—SHEET 3.

WITNESSES:
Wm. D. Bell
Adele Glatt

INVENTOR,
John K. Turton,
BY
Garthur Seward
ATTORNEYS.

UNITED STATES PATENT OFFICE.

JOHN K. TURTON, OF NEW YORK, N. Y.

WHEEL-RIM.

No. 866,986.      Specification of Letters Patent.      Patented Sept. 24, 1907.

Application filed September 22, 1906. Serial No. 335,706.

*To all whom it may concern:*

Be it known that I, JOHN K. TURTON, a citizen of the United States, residing in Richmond Hill, borough of Queens, city of New York, State of New York, have invented certain new and useful Improvements in Wheel-Rims; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

In the present heavy construction of automobile wheels having removable pneumatic, cushion or other similar elastic tires, much difficulty is met with whenever it becomes necessary to remove the tire from the wheel rim. In order to secure the best attaching effects, the tire is constructed to hug the rim closely and, being set in a groove therein and of heavy and cumbersome construction, it is a source of great trouble and inconvenience to make the tire leave the groove of the rim and clear the rim's extreme periphery; in order to accomplish this, the tire must be expanded to the size of the rim measured by its maximum diameter. The same difficulty, to the same degree, is of course met with in replacing the tire on the rim.

Figure 5:
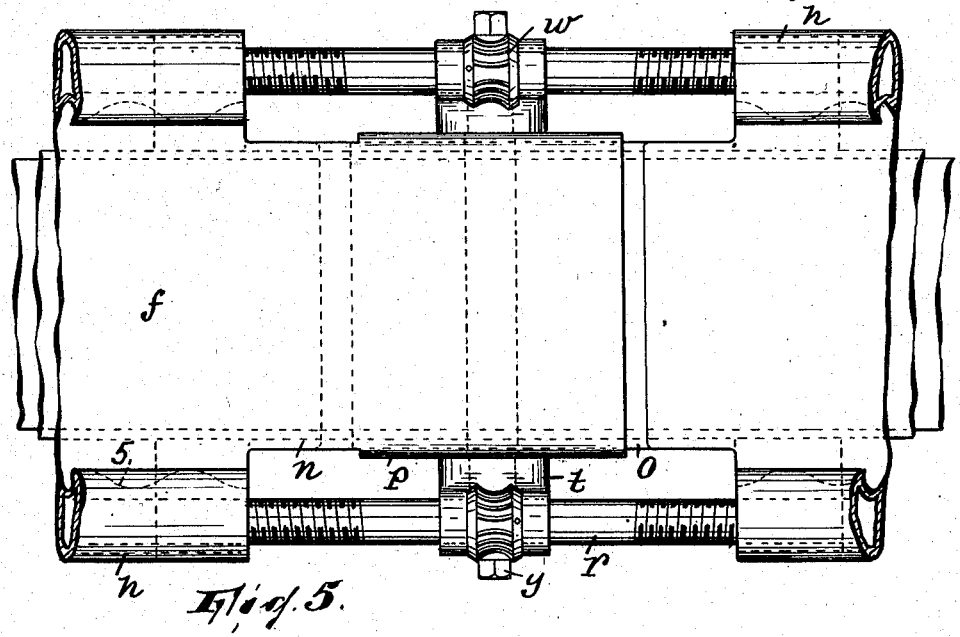
Figure 6:
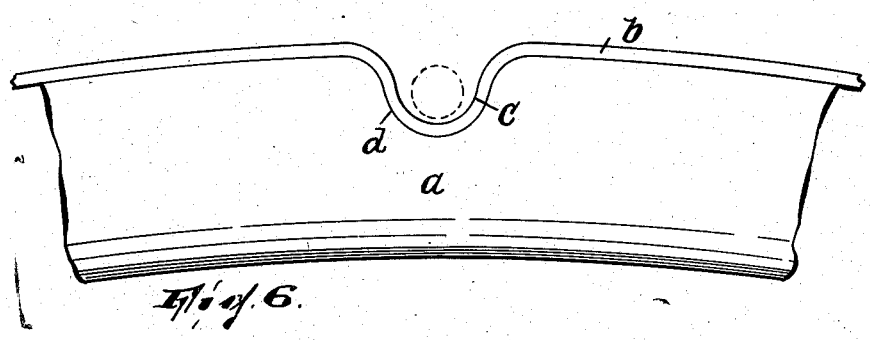
Figure 8:
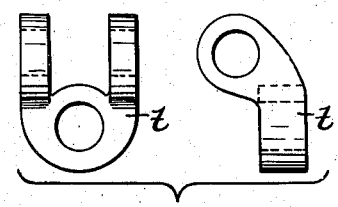
Figure 7:
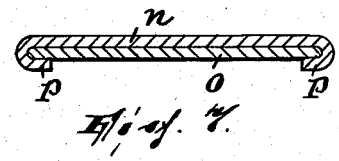

The principal object of the invention herein shown and described is to provide a wheel in which this difficulty may be fully avoided, so that the tire, when necessary, may be removed or replaced with the minimum of inconvenience and loss of time; incidentally, my invention involves a simplified, more substantial and durable connection between the various parts and particularly between the rim and felly, which latter are moreover rendered readily and quickly separable in themselves, in addition to several other features of advantage, all of which will be at once apparent to those skilled in the art on a view to this specification and the accompanying drawings, wherein similar letters indicate the same parts throughout, and wherein Figure 1 is a view in side elevation of so much of the improved wheel as shows the essential features thereof; Fig. 2 is a sectional view on line $x$—$x$ of Fig. 1; Fig. 3 is a sectional view on line $y$—$y$ of Fig. 1, the tire being removed; Fig. 4 is a view like Fig. 1 with the tire and other parts removed; Fig. 5 is a plan view of what is shown in Fig. 1, with the tire removed; Fig. 6 is a side elevation of the rim; Fig. 7 is a sectional view on line $z$ of Fig. 4; and, Fig. 8 illustrates a detail.

The felly of the wheel is shown as comprising the felly proper or body part $a$, which may be of wood, and the steel band or shoe $b$ which, being shrunk onto the part $a$, binds the same and the spokes and hub of the wheel together into a rigid substantial structure not affected by vibration and similar injurious influences. For a purpose hereinafter set forth, the band $b$ is bent to form a transverse groove $c$ in the tread of the felly, such band being received by a corresponding groove $d$ formed in the periphery of part $a$; also, the felly is chamfered, as at $e$, at both sides of its tread, giving the same in the portion involved a wedge-like form.

$f$ designates the rim, which is preferably formed by so collapsing and thereupon otherwise shaping a metallic tube as to produce the laminar body part $g$ and two lateral hollow flanges $h$ which curve upwardly and inwardly toward each other to produce the shoulders $i$ and grooves $j$ and which project downwardly below the plane of the body part $g$ to form therewith the groove $k$, which is adapted for the reception of the tread portion of the felly. In order to secure a perfect fit between rim and felly, whereby to avoid lateral play and "creeping" of the rim, the wedge portion of the latter (already described) is utilized by so forming the metal of the rim that the side walls $l$ of the groove $k$ are convergent (Fig. 3).

The rim is not continuous or unbroken, but is split, as shown in the drawings. Into each end of each hollow flange $h$ thereof is fitted a plug or block $m$ which may be brazed to the metal of the rim to make it substantially an integral and rigid part thereof. As, in practice, the ends of the rim, thus split, would stand somewhat distanced from each other, a continuous bearing for the tire may be formed where a gap would otherwise exist by extending the upper lamina of the body part $g$ of the rim at one side of the gap and the under lamina of the body part $g$ at the other side of the gap, as at $n$ and $o$, respectively, and overlapping them; they may be made to hug each other closely by turning the edge portions $p$ of the former around those of the latter, as shown in Figs. 2 and 7, whereby to avoid any chance of their pinching the inner tube, where the tire comprises such.

The blocks $m$ are formed with alined tapped holes $q$ and these receive the ends of reversely threaded screws $r$ adapted for contracting or expanding the rim by causing them to alter the distance between the ends of the rim at the split upon turning the screws. As a means for manipulating both screws at once, whereby to cause any change of diameter in one side of the rim to have its precise counterpart in the other, I provide the following arrangement:

$s$ is a spindle bound to the two screws $r$ at right angles thereto by slings $t$ of U-shape in front elevation, in which said spindle may rotate but is prevented from longitudinal movement therein by shoulders $u$ which engage the inner faces of said slings. The ends of the spindle are formed as worms $v$, and engaging with each worm is a worm-wheel $w$ which is pinned onto the corresponding screw $r$ and keeps the sling, which has a bearing on the screw both sides of the worm-wheel, from sidewise movement. Upon rotating the spindle the gearing described will rotate both screws simultaneously, so that a uniform adjustment is transmitted to the rim; such rotation may be affected upon applying a crank or wrench, such as $x$, to one of the squared ends $y$ of spindle $s$. The spindle $s$ is received by the hereinbefore described groove $c$ of the felly.

The tire shown in the drawings is of the inner tube, pneumatic, so-called "clincher" type, comprising the open casing or tire proper 1 having the laterally flanged or shouldered base portion 2, and the inner tube 3. It will be understood that when the tire is assembled with the rim and then inflated the flanges 2 will engage in the grooves $j$ and under the shoulders $i$ of the rim to interlock the rim and flange.

As will be hereinafter shown, the operative condition of the tire will be such that there is a grip produced as between tire and rim sufficient to prevent "creeping" of the tire; but this effect may be augmented or otherwise produced by forming co-engaging corrugations 4 5 in the base 2 of the tire proper and in the rim, the same forming a substantial obstacle to "creeping" when, for instance upon inflating the tire, they are made to interlock.

In assembling the parts, the rim being removed from the felly, the screws are turned by rotating the spindle in the proper direction to cause the screws to contract the split rim until its diameter is such that the tire may be slipped over the rim without undue difficulty. The crank is then turned in the opposite direction until the screws cause the rim to expand sufficiently so as to just about clear the peripheral diameter of the felly, whereupon the rim is placed in surrounding disposition with relation to the felly and the crank again rotated in the reverse direction, this time to cause the rim to contract and thus receive in its groove the peripheral portion of the felly. Having bound the rim to the felly under the proper tension, the tire (if it is of the pneumatic type) may be now inflated; or it may be already inflated when placed on the rim. It is preferable, of course, that the normal inside diameter of the tire, when inflated, be then at least no greater than the corresponding or outer dimension of the rim so that the resultant grip of the tire on the rim will of itself act to materially prevent the former against creeping.

My invention, as will be now obvious, provides a wheel construction wherein the parts are not only capable of assemblage and separation quickly and conveniently but are so formed as to coöperate to produce great strength and durability and withstand the enormous wear and tear to which structures of this character are peculiarly liable. As it requires but a short time to assemble or disassemble the parts, an automobile may carry with it an extra rim and tire fitted together, the tire fully inflated ready for quick application to any wheel upon its becoming unfit for service.

Having thus fully described my invention, what I claim as new and desire to secure by Letters Patent is:

1. In a wheel, the combination of a felly, a rim extending around the same, a tire extending around the rim, said rim being expansible and contractible, and means permanently carried by the rim and operating on both sides of the rim simultaneously for effecting the expansion and contraction of the rim, substantially as described.

2. In a wheel, the combination of a felly, a rim extending around the same, the one being grooved and receiving the other, a tire extending around the rim, and means permanently carried by the rim and operating on both sides of the rim simultaneously for effecting the expansion and contraction of the rim, substantially as described.

3. In a wheel, the combination of a felly, a rim extending around the same, a tire extending around the rim and the one being grooved and receiving the other, and means permanently carried by the rim and operating on both sides of the rim simultaneously for effecting the expansion and contraction of the rim, substantially as described.

4. In a wheel, the combination of a felly, a rim extending around the same and being split, a tire extending around the rim, and means permanently carried by the rim and operating on both sides of the rim simultaneously for drawing together and forcing apart the ends of the rim at the split therein, substantially as described.

5. In a wheel, the combination of a felly, a rim extending around the same and being split, a tire extending around the rim, rotative screws connecting the ends of the rim at the split and having their ends reversely threaded and engaging the same, and means for operating said screws simultaneously substantially as described.

6. In a wheel, the combination of a felly, a rim extending around the same and being split, a tire extending around the rim, rotative screws connecting the ends of the rim at the split and having their ends reversely threaded and engaging the same, and means for connecting said screws for simultaneous operation, substantially as described.

7. In a wheel, the combination of a felly, a rim extending around the same and being split, a tire extending around the rim, rotative screws connecting the ends of the rim adjacent the sides thereof at the split and having their ends reversely threaded and engaging the same, a worm wheel on each screw and means for operating both worm wheels together, substantially as described.

8. In a wheel, the combination of a felly, a rim extending around the same and being split, a tire extending around the rim, rotative screws connecting the ends of the rim adjacent the sides thereof at the split and having their ends reversely threaded and engaging the same, a worm-wheel on each screw, and a transverse worm engaging both worm-wheels, substantially as described.

9. In a wheel, the combination of a felly having its tread portion of wedge-form in cross-section, a rim extending around the felly and being split, said rim having a groove on its inside snugly receiving said wedge-portion of the felly, a tire surrounding th rim, and means for effecting the expansion and contraction of the rim, substantially as described.

10. In a wheel, the combination of a felly, a rim consisting of a metallic tube flattened longitudinally in the intermediate part thereof to form a laminar body-portion and having the side portions thereof projecting above and below said body portion to form exterior and interior grooves, the interior groove receiving the felly, and a tire surrounding the rim and received by the exterior groove thereof, substantially as described.

11. In a wheel, the combination of a felly having a transverse groove in the tread portion thereof, a rim extending around the same and being split, a tire extending around the rim, and means for effecting the expansion and contraction of the rim, said means comprising rotative screws connecting the ends of the rim adjacent the sides thereof at the split and having their ends reversely threaded and engaging the same, a worm wheel on each screw and a transverse worm engaging both worm-wheels and extending in said groove under the rim, substantially as described.

In testimony, that I claim the foregoing, I have hereunto set my hand this 14th day of Sept., 1906.

JOHN K. TURTON

Witnesses:
JOHN W. STEWARD,
ADELE GLATT.